United States Patent

[11] 3,607,840

| [72] | Inventors | Shozo Yura;<br>Yoshio Koyake, both of Kyoto-shi, Japan |
|---|---|---|
| [21] | Appl. No. | 784,219 |
| [22] | Filed | Dec. 16, 1968 |
| [45] | Patented | Sept. 21, 1971 |
| [73] | Assignee | Honshu Chemical Industry Co. Ltd.<br>Chuo-ku, Tokyo, Japan |
| [32] | Priority | Aug. 2, 1968 |
| [33] | | Japan |
| [31] | | 43/54309 |

[54] METHOD FOR MANUFACTURING POLYHEXAMETHYLENEADIPAMIDE
2 Claims, No Drawings

| [52] | U.S. Cl. | 260/78 R,<br>260/95 R |
|---|---|---|
| [51] | Int. Cl. | C08g 20/20 |
| [50] | Field of Search | 260/78 |

[56] References Cited
UNITED STATES PATENTS

| 2,130,523 | 9/1938 | Carothers | 260/78 |
| 2,190,770 | 2/1940 | Carothers | 260/78 |
| 3,329,653 | 7/1967 | Beavers et al. | 260/78 |
| 3,459,714 | 8/1969 | Wolfes et al. | 260/78 |

*Primary Examiner*—Harold D. Anderson
*Attorney*—Woodhams, Blanchard and Flynn

ABSTRACT: The present invention provides an improved method for manufacturing polyhexamethyleneadipamide directly from hexamethylenediamine and adipic acid ester by heating adipic acid ester together with hexamethylenediamine and water to hexamethylene diammonium adipate (hereinafter called AH salt), the alcohol formed during said heating process being taken out of the system continuously by distillation, and then polymerizing said AH salt.

Further advantages offered by the method according to the present invention are that the product is less colored and the alcohol formed from the adipic acid ester can be recovered with a high yield.

3,607,840

METHOD FOR MANUFACTURING POLYHEXAMETHYLENEADIPAMIDE

BACKGROUND OF THE INVENTION

1. Field of the Invention

The present invention relates to a method for manufacturing polyhexamethyleneadipamide directly from hexamethylenediamine and adipic acid ester, and relates more particularly to the production of polyhexamethyleneadipamide wherein AH salt is initially obtained by heating a $C_1$-$C_4$ alkyl ester of adipic acid together with hexamethylenediamine and water recovering the alcohol formed during the process, and then converted into polyhexamethyleneadipamide by polymerization.

2. Description of the Prior Art

In general, in the conventional methods of manufacturing polyamide, AH salt is formed directly from adipic acid and hexamethylenediamine, and after decolorization and refining, if necessary, said salt is polymerized. Another method, on the other hand, is widely known by French Patent No. 1,371,700, which discloses a method of manufacturing polyamide from hexamethylenediamine and adipic acid ester instead of adipic acid. In the prior case where adipic acid is used directly, the polymerization is conducted after the AH salt is stabilized and refined, thus providing a product of less coloration, and the formation of tar due to the existence of impurities is small; while in case where adipic acid ester is used as a starting material, hexamethylenediamine is polymerized at a raised temperature in a free state, so coloration of the product and the formation of tar somewhat increase. The quantity of alcohol recovered from the ester is in general small.

SUMMARY OF THE INVENTION

The object of the present invention is to provide an improved method, both simple and economical, to obtain polyhexamethyleneadipamide of high purity from hexamethylenediamine and adipic acid ester. According to the present invention, AH salt is formed by heating adipic acid ester together with hexamethylenediamine and water, and alcohol which is formed during the process is separated and eliminated by distillation. AH salt which is formed in this way is then polymerized and polyhexamethyleneadipamide of high purity is thus obtained directly from hexamethylenediamine and adipic acid ester in a more concise and economical procedure.

DESCRIPTION OF THE PREFERRED EMBODIMENTS

The inventors, having conducted various research works and experiments in an effort to correct the defects seen in the conventional methods have discovered that when the adipic acid ester is warmed up in the presence of hexamethylenediamine and water, the adipic acid ester is readily hydrolyzed at the temperature below 100° C. to form AH salt. To explain more particularly, in the present invention, AH salt is formed by heating adipic acid ester together with hexamethylenediamine and water, the alcohol which has been formed during said process being taken out of the system continuously by distillation, and then the resulting AH salt is polymerized. The alcohol, which is formed at the time of hydrolysis of adipic acid ester, can be taken out of the system continuously by means of distillation and recovered satisfactorily. An aqueous solution of AH salt thus obtained can be used in the succeeding process without being submitted to any treatment; however, if occasion requires, AH salt may be decolorized and refined before being put to the succeeding process; and then it is polymerized according to the known method.

A satisfactory result is obtained in this process when adipic acid ester and hexamethylenediamine have the mol ratio of 1:1; however, in order to increase the recovery of the alcohol, shorten the time required for hydrolysis, and minimize the coloration of the product, hexamethylenediamine may be used 5 –10 percent in excess of said molar ratio, and after hydrolysis adipic acid, whose quantity is equivalent to the excess quantity of said hexamethylenediamine, may be added.

It is desirable to keep the quantity of water to be used in hydrolysis of adipic acid ester in the range of 20–70 percent in concentration of the obtainable AH salt.

Should the polymerization reaction go too far during hydrolysis, decolorization and refining would be impaired owing to the increase of the viscosity of the aqueous solution. It is therefore highly advisable that the hydrolysis is conducted at a temperature below 100° C. to avoid polymerization of AH salt, and in an atmosphere of nitrogen to prevent coloration and oxidation of it.

Decolorization and refining of AH salt after hydrolysis may be conducted according to conventional methods generally applied in decolorization and refining, and it is preferred to use active carbon in such procedures.

When the manufacture of polyhexamethyleneadipamide is conducted according to the method claimed by the present invention, the polymer of less colored and high purity can be produced in high yield. The recovery of alcohol from adipic acid ester is also accomplished in high yield. The procedure of the present invention provides an improved method both fairly simple in process and very economical in manufacturing costs. The following examples illustrate the invention; however, the present invention is not intended to be limited by the details set forth in the examples.

EXAMPLE 1

30.8 g. (0.265 mol) of hexamethylenediamine (HMD), 46.2 g. (0.265 mol) of adipic acid dimethyl ester (AE) and 140 cc. of water were put into a 300-cc. flask and then heated to 95° –100° C. in the oil bath. As soon as the contents were stirred, methanol began to be distilled together with some quantity of water. The mixed vapor of the distilled methanol and water was led to the distilling column and methanol was recovered from the top of the distilling column. The water taken out of the bottom of the distilling column was sent back to the reactor, and the reactant solution was adjusted to the constant concentration desired for the purpose. Two hours and a half later, the temperature of the distilled methanol rose from 65° C. to 95° C. and the quantity of the recovered methanol was 16.6 g. (recovery percentage 97.5 percent), which showed that the hydrolysis had been almost completed. Thus 200 g. of the reactant solution was obtained and was slightly straw-colored to which 4 g. of active carbon was added and said solution was stirred for ten minutes at the temperature ranging from 60° C. to 70° C. and filtered, then a colorless and transparent aqueous solution of AH salt was obtained as a result of this process.

The aqueous AH salt solution was heated from 100° C. up to 280° C. in two hours, while water was removed from the reaction zone introducing nitrogen into it to avoid the effect of air, followed by polymerization for two hours keeping at 280° C. and a light-colored polyamide resin, with $\ln\eta/c$ (2 percent m-cresol, 30° C.) 0.5, and melting color (APHA) American Public Health Association of 250, was accordingly obtained.

On the other hand, 30.8 g. of hexamethylenediamine, 46.2 g. of adipic acid dimethyl ester, and 5.1 g. of water the quantity corresponds to Example 1 of the French patent, were polymerized directly under the same condition mentioned above without decoloring the resulting AH salt, and the polyamide resin thus obtained was colored at APHA 800.

EXAMPLE 2

26.9 g. of hexamethylenediamine (0.232 mol); 38.8 g. of adipic acid dimethyl ester (0.223 mol); and 110 cc. of water (mol ratio HMD/AE =1.04 ) were put to hydrolysis according to the same method as described example 1, and two hours later 14 g. of methanol (recovery percentage 98 percent) was recovered. 1.6 g. of adipic acid was added to 161 g. of the reactant solution in order to adjust the mol ratio, to which 3.2 g. of active carbon was added and decolorized by the method of example 1, and a colorless and transparent aqueous solution of AH salt was obtained. The temperature of this aqueous solution was raised from 100° C. to 280° C. during one hour and kept at 280° C. for another one hour, and then the pressure was reduced to 5 mm. Hg for two hours without changing the temperature, during which time polymerization was carried out and polyamide resin of $\ln\eta/c=0.9$ and melting color of 270 was obtained.

We claim:

1. The process which comprises forming an aqueous solution of hexamethylene diammonium adipate (AH salt) by heating approximately molar proportions of hexamethylene diamine and a lower alkyl ($C_1$ to $C_4$) diester of adipic acid (AE) in the presence of 20 to 70 weight percent of water, based on the obtainable AH salt, at a temperature below 100° C. and sufficient to remove the resulting alkanol by distillation, removing the alkanol while maintaining the aqueous content of the reaction mixture, thus to form an aqueous solution of AH salt in 20 to 70 weight percent of water and subsequently heating said solution at a temperature sufficient to remove the water and then polymerizing the remaining AH salt to form resinous polyhexamethyleneadipamide.

2. The process of claim 1 wherein during the salt-forming step the amount of hexamethylene diamine initially used is 5 to 10 percent in excess of the molar ratio of the AE, and after removal of substantially all of the alkanol, a quantity of adipic acid is added equivalent to the excess diamine initially used.